United States Patent Office 2,766,225
Patented Oct. 9, 1956

2,766,225

PEPTIDE AND POLYPEPTIDE PRODUCTION

George W. Kenner, Cambridge, England, assignor to National Research Development Corporation, London, England, a British company No Drawing. Application March 28, 1955,
Serial No. 497,440

Claims priority, application Great Britain
November 28, 1950

13 Claims. (Cl. 260—112)

This invention is for improvements in or relating to the manufacture of peptides, polypeptides and derivatives thereof and has for an object to provide a process which will be convenient, adaptable for commercial operations and which will permit of the synthesis of peptides and polypeptides in satisfactory yield.

In general, the synthesis of peptides and polypeptides is based upon attempts to couple a naturally occurring amino-carboxylic acid i. e. an amino carboxylic acid of the type obtainable on hydrolysis of the proteins or a peptide derivative of such an acid with another naturally occurring amino-acid or peptide in an aqueous medium. Although in certain instances and with the use of certain methods, the synthesis can be carried out in an aqueous medium, the prior processes are best adapted for the coupling of the amino-acid or peptide derivative with the ester of an amino-acid or peptide in an anhydrous medium. This has involved difficulties in the synthesis of all but the simplest peptides owing to the difficulties in connection with the solubility of the reagents in the various media and, further owing to the difficulty arising from the multiplicity of stages in the synthesis of a single peptide linkage.

It has now been found that these difficulties may be overcome in a simple manner by the process provided by the present invention, in which process the peptide linkage is formed by reacting a naturally occurring amino-carboxylic acid or a peptide produced therefrom with a mixed anhydride of sulphuric acid and a naturally occurring amino-acid or peptide prepared therefrom the reaction being carried out in solution in a solvent in which the amino group of the acid or peptide is free. Preferably the reaction is carried out in aqueous solution in which case it is a simple matter to ensure that the said amino group is free, rather than linked with acidic molecules in the quaternary ammonium state by employing non-acid conditions. The reaction may however be carried out in an organic solvent in which case the free amino group-containing acid may be reacted in the form of a soluble ester thereof, conveniently in the form of an ester with an alcohol containing from 1 to 3 carbon atoms such as methyl alcohol, ethyl alcohol or isopropyl alcohol. Mixed anhydrides of the said type which are used as starting materials are new substances which contain the group—$CO.O.SO_3$. They may be prepared from a wide selection of the naturally occurring amino-acids in a simple preliminary stage of the process or in one or more intermediate stages of the process where a product containing a plurality of peptide linkages is to be produced.

The preparation of the mixed anhydrides is readily effected by reacting an N-substituted salt (see later) of the amino-acid with sulphur trioxide under anhydrous conditions. Sulphur trioxide is a highly reactive substance and it is accordingly normally desirable to moderate the reaction therefore by contacting the N-substituted salt and the sulphur trioxide in solution in a mutual solvent. The sulphur trioxide may for example be distilled on to the surface of a solution of the salt but in practice it is found more convenient to add the sulphur trioxide in the form of a solution thereof in a solvent, preferably in the same solvent. It is found in practice that the reaction with the sulphur trioxide is most easily moderated by employing as the solvent, a liquid with which sulphur trioxide combines to form a labile chemical complex. Dimethylformamide is the preferred complex forming solvent for this purpose, being found to reduce the reactivity of the sulphur trioxide sufficiently to give an easily controlled reaction without reducing the said reactivity sufficiently to render the reaction difficult or slow. Other complex forming solvents which may be used, if desired, though less successfully are tertiary amines, for example pyridine, and others, for example dioxane.

By employing sulphur trioxide in this manner there may be prepared mixed anhydrides from a wide range of naturally occurring amino-acids, all of which anhydrides react readily with salts providing the anions of the naturally occurring amino acids to form peptide-linked products. The mixed anhydrides are obtainable in particularly high yield from those naturally occurring amino acids which are free from reactive side chains such for example as those naturally occurring amino acids which, apart from the oxygen atoms in their carboxyl groups and the nitrogen atoms in their amino groups, are formed from carbon and hydrogen atoms only. Among acids of this type are the purely aliphatic mono-amino acids such as alanine, glycerine, methyl glycine, leucine and isoleucine, the purely aliphatic di-amino acids such as lysine and ornithine and araliphatic amino acids such as phenlyalanine. Mixed anhydrides are also obtainable from naturally occurring amino acids of other types e. g. from acids containing heterocyclic nitrogen such as histidine or tryptophane as well as acids which contain reactive side chains e. g. mercapto groups as in cysteine or hydroxyl groups as in tyrosine. With acids containing reactive side chains the yield of anhydride may be somewhat reduced although it is usually sufficient to render the process feasible. It is to be noted that the position and number of the amino groups in the acid is without effect on the production of the anhydrides. Reference has been made to the reaction of the amino acids with the sulphur trioxide in the form of their N-substituted salts. It is to be understood that in such salts the amino groups present are protected by groups, e. g. acyl groups which are readily removable from the final product for example by hydrolysis or hydrogenolysis. The preferred protective groups for this purpose are carbobenzyloxy groups and p-toluenesulphonyl groups although those skilled in the art will appreciate that the nature of the protective group is not critical and that other protective groups may be employed if desired following the standard techniques of synthetic chemistry. There may be employed for instance such groups as phthaloyl groups, formyl groups and p-nitro-carbobenzoxy groups.

The conversion of the N-substituted acid into its salt may be effected in a stage preliminary to that wherein the anhydride is produced, e. g. the acid may be treated with aqueous alkali and then obtained in dry crystalline form by fractional crystallisation or evaporation to dryness for reaction with the sulphur trioxide under anhydrous conditions. It is however more convenient to form the salt under anhydrous conditions as an integral step in the preparation of the solution with which the sulphur trioxide is to be reacted. A suitable procedure is to dissolve the N-substituted acid in the solvent to be used for the sulphur trioxide reaction and then to add to the resulting solution, an organic solvent containing a soluble substance capable of reacting with the acid to form a salt under anhydrous conditions. It is then possible, by distilling said organic solvent under vacuum, e. g. at 50 to 55° C., to remove any traces of water which may be present thereby obtaining the salt in substantially anhydrous solution or suspension. For this purpose the most suitable soluble substances are alkoxides of alkali metals or quaternary ammonium groups e. g. potassium methoxide, sodium ethoxide, lithium methoxide or ethoxide, phenyl trimethylammonium methoxide, diethyl dimethyl ammonium methoxide, etc. Lower aliphatic alcohols such as methyl or ethyl alcohol are preferred as the solvents. Lithium salts of the N-substituted acids are in many cases preferable to the salts of the other alkali metals in view of their relatively high solubility in organic solvents.

The foregoing procedures may be used to give rise to a wide range of mixed anhydrides of sulphuric acid and naturally occurring amino acids wherein the amino groups are protected by hydrolysable groups.

In accordance with the present invention, mixed anhydrides of this type are preferably reacted with an aqueous solution of pH of about 7 and containing the anion of the free amino group-containing amino acid or peptide to produce a peptide linked product. This reaction, which avoids the use of anhydrous conditions, takes place rapidly and may be completed in the matter of a few minutes even at 0° C. or lower. Room temperature or higher temperatures may be employed if desired, the reagents and the reaction products being quite stable. In typical experiments conducted at 20° C. and lasting respectively for one hour, two hours and longer periods the amount of the starting materials not accounted for as peptide-linked product is found to be unchanged. The product of the reaction is itself a salt of an amino acid of which the amino group or groups are protected by the acyl groups present in the original acid from which the mixed anhydride was prepared. Salts of this type are found to react easily with sulphur trioxide after the manner indicated above to give mixed anhydrides. It follows then that having prepared a peptide-linked product by the process of the invention, this product can be converted to a mixed anhydride and reacted with further solution providing the ion of a naturally occurring amino acid to produce a product having a further peptide linkage, no regeneration of the amino group or groups being necessary. Again the product is a salt of an amino acid (in this case a di-peptide) having a protected amino group or groups and again it may be converted to a mixed anhydride for conversion to a higher peptide. It is clear then that by repeating these procedures there may be produced polypeptides of increasing complexity.

For the conversion of a peptide to a peptide of increased complexity by the process of the invention the peptide must first be obtained in the form of an N-substituted mixed anhydride with sulphuric acid. The peptide is most conveniently obtained by forming peptide linkages between amino acid residues by following the process of the invention itself, but it may alternatively be prepared from naturally occurring amino acids by other synthetic methods. Stated generally therefore, the process is applicable not only to mixed anhydrides prepared from simple unit amino acids of the type obtainable on hydrolysis of the proteins but also to peptides having two or more amino acid residues which have been prepared from such constituent amino acids by the process of the invention itself or by any other process.

It is however preferable to take advantage of the present process for the whole of the stage by stage synthesis of a desired polypeptide thereby achieving its advantages of direct production of the peptide in N-substituted form, of simplicity of operation and of high yield of product throughout. It has for example been possible by alternately forming a mixed anhydride and reacting it with an amino acid, or a peptide containing from 1 to 3 amino acid residues, in aqueous solution at a pH of about 8, without as an additional step at each stage recovering the anhydride from the reaction mixture in which it is produced, to produce tripeptides in an overall yield, based on the original amino acids, of over 80% by weight (in one case of 92% by weight) and tetrapeptides in an overall yield of over 70% by weight. Higher peptides are produced as would be expected, in somewhat reduced yield but nevertheless in sufficient yield to be attractive.

The composition of the aqueous solution providing the anion of the amino acid or peptide is not critical. It is only essential that the pH of the solution be non-acid which implies the presence of a solute capable of giving an alkaline reaction. The most convenient solutes of this type are the caustic alkalis although strong organic bases e. g. trimethyl-ammonium hydroxide may be used if desired. The amino acid or peptide may be incorporated in the solution in combination with the base or part of the base if desired i. e. in the form of a salt and the pH of the solution raised, if necessary, by adding the requisite proportion of a free base, which may be the same base as, or a different base from that contained in the salt. It is usually more convenient however to employ an amino acid or peptide as such, and to provide the base separately. The acid or peptide may for example be added in the form of a solution thereof in caustic alkali. It is quite unnecessary to separate the mixed anhydride from the reaction mixture in which it is produced since the other components of the reaction mixture may be present in the aqueous solution without interfering with the reaction provided of course that sufficient base is used to give an alkaline reaction where an excess of sulphur trioxide remains after the formation of the mixed anhydride. It is however possible, and normally preferred to avoid such an excess of sulphur trioxide by employing this reagent in molar proportion.

Reference has been made to reacting the amino acid or peptide in the form of an ester thereof in solution in an organic solvent. For this purpose there may be employed any convenient organic solvent which is inert to the reactants and in which the reactants have sufficient solubility. By far the most convenient solvent however is the solvent in which the mixed anhydride has been prepared. Thus by following the method of the invention the anhydride may be prepared in solution in dimethylformamide and the free amino group-containing ester of the amino acid or peptide reacted therewith by stirring in said ester in the solid state or adding it in solution in a further portion of dimethylformamide.

The following examples provide specific illustrations of the manner in which the invention may be carried into effect:

EXAMPLE 1

To a solution of p-toluenesulphonyl-DL-alanine (2.43 g.) in anhydrous dimethylformamide (60 cc.) were added 8.4 cc. (i. e. 1 equivalent) of a methyl alcohol solution of potassium methoxide and the solvent was then partially evaporated in vacuum (15 mm.) at 55° C. through a 6-inch fractionating column. The remaining solution (about 46 cc.) was cooled to 20° C. and was treated with 6.55 cc. (1 equivalent) of sulphur trioxide in solution in dimethylformamide (i. e. in the form of a complex).

The solution now contains the mixed anhydride of the toluenesulphonylalanine and sulphuric acid, in the form of the potassium salt, which can be directly used for the production of a complex amino-acid or which can be isolated.

EXAMPLE 2

Carbobenzyloxyglycine (2.29 g.) was treated with potassium methoxide and sulphur trioxide as in Example 1. After 5 minutes at 20° C. the well-stirred anhydride solution was cooled in an ice-salt bath and treated with a solution of DL-phenylalanine (1.98 g., i. e. slightly more than 1 equivalent) in normal aqueous sodium hydroxide (12 cc.) and water (10 cc.) containing phenolphthalein, followed immediately by sufficient half-normal aqueous sodium hydroxide to restore the pink colour of the phenolphthalein. After a further 10 minutes, sulphuric acid was added till the solution was colourless and the reaction mixture was then evaporated in vacuum. The residue was then dissolved in normal aqueous sulphuric acid (12 cc.) and ethyl acetate (50 cc.), the layers separated and the acid layer extracted four times with ethyl acetate. Evaporation of the combined ethyl acetate extracts (350 cc.) yielded an oil (5.15 g.) which was distributed in an eleven transfer partition between ethyl acetate and a phosphate buffer solution (7 mols. $KH_2PO_4$:3 mols $K_2HPO_4$). This separated the product (in 70% yield) (partition coefficient 1.69) from unchanged carbobenzyloxyglycine (in 30% yields) (partition coefficient 0.27) almost completely. The product recovered from tubes numbers five to ten in the series (2.4 g.) had a melting point of 161° C., and was recrystallised from ethyl acetate to yield carbobenzyloxyglycyl-DL-phenyl-alanine M. P. 162° C.

EXAMPLE 3

Methylalcohol (1.10 cc.) containing phenyltrimethylammonium methoxide (1 milli-mol) was added to a solution of carbobenzyloxyglycyl-DL-phenylalanine (356 mg.:1 milli-mol) in anhydrous dimethylformamide (15 cc.) and a portion of the solvent was fractionally distilled from the resulting mixture in vacuum at 52° C. To the stirred, clear solution, cooled to 0° C., was added a dimethylformamide solution (0.67 cc.) of the sulphur trioxide-dimethylformamide complex (1 milli-mol), followed, after 1 minute, by a solution of glycine (0.15 g.; 2 milli-mols) in normal aqueous sodium hydroxide (2 cc.) and water (5 cc.) containing phenolphthalein, the pink colour of which was restored as rapidly as possible by addition of the necessary amount of half-normal aqueous sodium hydroxide. After 10 minutes the reaction mixture was worked up as in Example 2, using a phosphate buffer containing 8 mols $KH_2PO_4$:2 mols. $K_2HPO_4$ in the counter-current distribution. The product (in 72% yield) had a partition coefficient of 0.84 and M. P. 142° C.

EXAMPLE 4

Methylalcohol (0.94 cc.) containing phenyl-trimethylammonium methoxide (1 milli-mol) was added to a solution of carbobenzyloxyglycyl-L-phenylalanine (356 mg.; 1 milli-mol) in anhydrous dimethylformamide (25 cc.) and a portion of the solvent was fractionally distilled from the resulting mixture in vacuum at 52° C. To the stirred, clear solution, cooled to 0° C., was added a dimethylformamide solution (0.75 cc.) of the sulphur trioxide-dimethylformamide complex (1 milli-mol), followed, after 1 minute, by a solution of glycine (113 mg.; 1.5 milli-mols) in normal aqueous sodium hydroxide (1.5 cc.) and water (1.5 cc.) containing phenolphthalein, the pink colour of which was restored as rapidly as possible by the addition of the necessary amount of half-normal aqueous sodium hydroxide.

After a further 3 minutes, sulphuric acid was added to bring the solution to pH 7, and the reaction mixture was then evaporated in vacuum. The residue was then dissolved in four-normal sulphuric acid (8 cc.) and ethyl acetate (30 cc.), the layers separated and the acid layer extracted six times with ethyl acetate. Evaporation of the combined ethyl acetate extracts (150 cc.) yielded an oil (501 mg.) which was distributed in a twenty-two transfer partition between ethyl acetate and a phosphate buffer solution (7.5 mols. $KH_2PO_4$:2.5 mols. $K_2HPO_4$). This separated the product (in 52% yield) (partition coefficient 0.69) from unchanged carbobenzyloxyglycyl-L-phenylalanine (in 48% yield) (partition coefficient 2.54). The product recovered from tubes numbers five to ten in the series was crystallised from a mixture of ethyl acetate and diethyl ether to yield carbobenzyloxy glycyl-L-phenylalanylglycine, having M. P. 156° C. and optical rotation (alpha)$D_{19.5}$=10.5°±2° in solution in ethyl alcohol.

This example demonstrates that the process of the invention can be used, at least in some cases, to lengthen the chain of an optically active peptide without causing racemisation.

The following compounds:

p-Toluenesulphonyl-DL-alanylglycine
Carbobenzyloxy-DL-alanylglycine
Carbobenzyloxyglycyl-DL-phenylalanine
Carbobenzyloxyglycyl-L-phenylalanine
Carbobenzyloxy-L-phenylalanylglycine
p-Toluenesulphonyl-glycyl-DL-phenylalanine have all been prepared by following the procedure given in Examples 2 to 4 utilising the appropriate starting material in substitution for the material used in the specific example.

EXAMPLE 5

Carbobenzyloxyglycylglycylglycine

Methylalcohol (9.4 cc.) containing phenyltrimethylammonium methoxide (10 milli-mol) was added to a solution of carbobenzyloxyglycine (2.09 g.:10 milli-mol) in anhydrous dimethylformamide (50 cc.) and a portion of the solvent was fractionally distilled from the resulting mixture in a vacuum at 52°. A dimethylformamide solution (9.0 cc.) of the sulphur trioxide-dimethylformamide complex (10 milli-mol) was added to the mixture, which had been cooled to 0°. The resulting solution was, in turn, added slowly to a stirred solution of glycylglycine (1.58 g., 12 milli-mol) and thymol blue in water (15 cc.); throughout the addition normal aqueous sodium hydroxide was also added at such a rate that the colour of the indicator corresponded to pH 8.7.

The product was isolated by neutralisation of the reaction solution with dilute sulphuric acid, evaporation of the solvents in vacuum and crystallisation of the residue by treatment with ethyl acetate (50 cc.) and 3 N-hydrochloric acid (12 cc.), which yielded 2.44 g. Further extraction of the acid layer with n-butanol and of the ethyl acetate with sodium hydrogen carbonate solution gave another crop (0.53 g.), which was combined with the first and crystallised from water, affording pure carbobenzyloxy-glycylglycylglycine (2.43 g., 74.5%), M. P. 196°.

EXAMPLE 6 p-Toluenesulphonylglycyl-L-phenylalanine

The condensation of p-toluenesulphonylglycine (0.458 g., 2 milli-mol) with L-phenylalanine (0.396 g., 2 milli-mol) was effected in the manner described above. The product (1.71 g., 86%) was isolated, after removal of the solvents by vacuum evaporation, by partition between ethyl acetate and sodium hydrogen carbonate solution, followed by acidification of the latter, extraction with ethyl acetate, evaporation of the ethyl acetate, and pouring a solution of the residue in ethanol (5 cc.) into water (50 cc.). It had M. P. 160.5°, and optical rotation (alpha) $o^{16}$=+50.3° in solution in ethanol.

EXAMPLE 7 p-Toluenesulphonylglycyl-DL-phenylalanylglycine

The condensation of p-toluenesulphonylglycine (0.458 g., 2 milli-mol) with DL-phenylalanylglycine (0.528 g., 2.4 milli-mol) was effected in the manner described above. The product (0.795 g., 92% was obtained by recrystallization from ethyl acetate instead of pouring the ethanolic solution into water but otherwise as in the foregoing example, and had M. P. 192°.

EXAMPLE 8 p-Toluenesulphonylglycyl-L-phenylalanyl-α-L-glutamylglycylcyclohexylamine

The condensation of p-toluenesulphonylglycyl-L- phenylalanine (1.88 g., 5 milli-mol) with α-L-glutamyl-glycylcyclohexylamine (1.43 g., 5 milli-mol) was effected in the manner described above. When ethyl acetate (40 cc.) and 3 N-hydrochloric acid (5 cc.) were added to the residue obtained by evaporation of the solvents, the majority (2.0 g.) of the product crystallised. The remainder (0.26 g., making 71%) was recovered by extraction of the hydrochloric acid with ethyl acetate and evaporation of the ethyl acetate extract to a syrup, which crystallised when treated with petroleum ether, B. P. 40–60°. It had M. P. 219–220.5° and optical rotation (alpha) $o^{18} = -9.05°$ in ethanolic solution.

EXAMPLE 9

*Carbobenzyloxyglycyl-L-alanyl-L-phenylalanylglycine*

The condensation of carbobenzyloxyglycyl-L-alanine (0.840 g., 3 milli-mol) with L-phenylalanylglycine monohydrate (0.720 g., 3 milli-mol) was effected as before except that the acid was neutralized with lithium methoxide in methanol, instead of phenyltrimethylammonium methoxide, and phenol red (pH 7.4) was used instead of thymol blue. After evaporation of the solvents in vacuum the product was extracted by ethyl acetate from 2.5 N-sulphuric acid (25 cc.). The resultant oil was purified by a one hundred transfer partition between ethyl acetate and a phosphate buffer solution (9 mols. $KH_2PO_4$:1 mol. $K_2HPO_4$) (partition coefficient about 1), followed by a nine hundred transfer partition between ethyl acetate and a phosphate buffer solution (8.5 mols. $KH_2PO_4$:k. 5 mols. $K_2HPO_4$) (partition coefficient 0.503). The product (0.522 g., 36%) had M. P. 168–175° and optical rotation (alpha) $o^{18} = -28°$ in solution in 2-methoxyethanol.

EXAMPLE 10

*Carbobenzyloxy-L-tryptopheyl-L-alanine*

The condensation of carbobenzyloxy-L-tryptophane (0.676 g., 2 milli-mol) was effected in the same way as in the previous example (using the lithium salt and phenol red). The product (0.601 g., 74%) was separated by a one hundred transfer partition between ethyl acetate and a phosphate buffer solution (3 mols. $KH_2PO_4$:7 mols. $K_2HPO_4$) (partition coefficient 2.77) and had M. P. 152.5–153°.

I claim:
1. A process for the manufacture of a product having at least one peptide linkage which comprises reacting a substance selected from the group consisting of amino carboxylic acids obtainable on hydrolysis of the proteins, peptides prepared from said amino carboxylic acids and esters of said amino acids and peptides in solvent solution wherein said substance has a free amino group with a mixed anhydride of sulphuric acid and an acid selected from the group consisting of the amino acids obtainable on hydrolysis of the proteins and peptides prepared therefrom, the amino groups of said mixed anhydride being protected.

2. A process according to claim 1 in which said substance is an ester of an amino acid with an alcohol containing from 1 to 3 carbon atoms.

3. A process according to claim 2 in which said anhydride and said substance are reacted in solution in dimethylformamide.

4. A process for the manufacture of a product having at least one peptide linkage which comprises reacting an aqueous solution of pH of about 7 and containing an anion of an amino carboxylic acid obtainable on hydrolysis of the proteins with a mixed anhydride of sulphuric acid and an acid selected from the class consisting of the amino carboxylic acids obtainable on hydrolysis or the proteins and peptides prepared therefrom, the amino groups of said acid being acylated.

5. A process according to claim 4 in which said anion is provided by an alkali metal salt of said amino carboxylic acid.

6. A process according to claim 5 in which said salt is provided by an alkali metal salt of an alpha amino carboxylic acid.

7. A process according to claim 4 in which the reaction with said mixed anhydrides is effected at a pH of about 8.

8. A process for the manufacture of a product having two peptide linkages which comprises reacting an aqueous alkaline solution, containing the anion of an amino carboxylic acid obtainable on hydrolysis of the proteins, with a mixed anhydride of sulphuric acid and an amino carboxylic acid obtainable on hydrolysis of the proteins, the amino group of said acid being acylated, thereby producing a reaction mixture containing a product having one peptide linkage, recovering said product from said reaction mixture, converting said product to a salt by reaction with a lower alkoxide selected from the class consisting of alkali metal alkoxides and quaternary ammonium alkoxides in solution in dimethylformamide, contacting the resulting salt solution under anhydrous conditions with sulphur trioxide thereby forming a solution containing mixed anhydride of sulphuric acid and said product and reacting the mixed anhydride in solution with an amino carboxylic acid obtainable on hydrolysis of the proteins in the presence of sufficient aqueous alkali to produce a pH greater than 7.

9. A process according to claim 8 in which the sulphur trioxide is added to said resulting salt solution in the form of a solution of sulphur trioxide in dimethylformamide.

10. A process for the manufacture of a product having at least one peptide linkage which comprises reacting an aqueous solution of pH of about 7 and containing the anion of a peptide containing the residues of from 2 to 3 amino carboxylic acids obtainable on hydrolysis of the proteins with a mixed anhydride of sulphuric acid and an acid selected from the class consisting of the amino carboxylic acids obtainable on hydrolysis of the proteins and peptides prepared therefrom, the amino groups of said acid being acylated.

11. A process for the manufacture of a product having at least one peptide linkage which comprises reacting in aqueous solution containing sufficient caustic alkali to produce a pH of about 7, an amino carboxylic acid obtainable on hydrolysis of the proteins with a mixed anhydride of sulphuric acid and an acid selected from the class consisting of the amino carboxylic acids obtainable on hydrolysis of the proteins and peptides prepared therefrom, the amino groups of said acid being acylated.

12. A process according to claim 4 in which the acylating group is a carbobenzyloxy group.

13. A process according to claim 4 in which the acylating group is a p-toluene-sulphonyl group.

References Cited in the file of this patent

Anson et al.: Advances in Protein Chemistry (1949), vol. 5, p. 11, Academic Press Inc., New York, N. Y.